(12) United States Patent
Streather et al.

(10) Patent No.: US 8,562,449 B2
(45) Date of Patent: Oct. 22, 2013

(54) BREATHING MODE DAMPER

(75) Inventors: Gavin Streather, Commerce Township, MI (US); Robert L. Weiss, Sterling Heights, MI (US); Craig A. Campbell, West Bloomfield, MI (US); Arthur Ball, Oxford, MI (US)

(73) Assignee: GKN Driveline North America, Inc., Aurbun Hills, MI (US)

( * ) Notice: Subject to any disclaimer, the term of this patent is extended or adjusted under 35 U.S.C. 154(b) by 0 days.

(21) Appl. No.: 13/505,089

(22) PCT Filed: Nov. 3, 2009

(86) PCT No.: PCT/US2009/063107
§ 371 (c)(1),
(2), (4) Date: Apr. 30, 2012

(87) PCT Pub. No.: WO2011/056166
PCT Pub. Date: May 12, 2011

(65) Prior Publication Data
US 2012/0220384 A1    Aug. 30, 2012

(51) Int. Cl.
*F16F 15/12* (2006.01)
*F16C 3/02* (2006.01)

(52) U.S. Cl.
USPC .......................... 464/180; 464/183

(58) Field of Classification Search
USPC .................... 464/77, 127, 180, 183; 74/574.4
See application file for complete search history.

(56) References Cited

U.S. PATENT DOCUMENTS

| | | | | |
|---|---|---|---|---|
| 2,360,157 A | * | 10/1944 | Olson | 464/77 X |
| 4,495,683 A | * | 1/1985 | Delhaes | |
| 6,705,440 B2 | * | 3/2004 | Phelan et al. | |
| 2002/0117228 A1 | * | 8/2002 | Nakajima et al. | |
| 2002/0170792 A1 | | 11/2002 | Phelan et al. | |
| 2007/0087848 A1 | * | 4/2007 | Larsen et al. | 464/180 |
| 2007/0126278 A1 | | 6/2007 | Baek | |
| 2008/0105080 A1 | * | 5/2008 | Christenson | 74/574.4 |

FOREIGN PATENT DOCUMENTS

EP    1065078 A1    1/2001
JP    2004257474 A    9/2004

* cited by examiner

*Primary Examiner* — Gregory Binda
*Assistant Examiner* — Josh Skroupa
(74) *Attorney, Agent, or Firm* — Jennifer M. Brumbaugh; Mark Haynes; Rader, Fishman & Grauer. PLLC.

(57) ABSTRACT

A shaft assembly is provided to reduce breathing mode vibrations and resulting noises. The shaft assembly includes a shaft member having an outer surface and a damping member constructed at least in part from a damping material and including a substantially annular body and generally opposing ends. The opposing ends are biased such that at least a portion of the damping member engages with the shaft member.

16 Claims, 7 Drawing Sheets

BREATHING MODE DAMPER

TECHNICAL FIELD

The present disclosure relates to a damping member for a shaft.

BACKGROUND ART

A motor vehicle generally utilizes a propshaft to connect a transmission or power takeoff unit to a driving axle. Sometimes during operation of the motor vehicle undesired or objectionable noises are generated by high-speed rotation of the propshaft. One particularly troublesome source of propshaft noise is caused by breathing mode vibrations that can be perceived by the human ear as a ringing or a clunking type of noise. Breathing mode vibrations are typically defined as the radial expansion or contraction of an outer surface of the propshaft during operation.

One known solution to reduce noise created by the breathing mode vibrations is to place sound absorbing materials, such as cardboard or foam fillers, within the propshaft. However, using sound absorbing materials within a propshaft may have several disadvantages. For example, the sound absorbing materials can only be placed within the propshaft prior to propshaft being assembled in a vehicle. Some types of sound absorbing materials may affect the balance of the propshaft. Also, at least some sound absorbing materials may not be able to withstand the elevated temperatures created by an exhaust system during vehicle operation. Finally, sound absorbing materials only mask and do not directly alleviate the underlying cause of the propshaft noise.

Thus, there exists a need for a component that reduces the breathing mode vibrations of a propshaft to eliminate the noises head by a vehicle operation.

DETAILED DESCRIPTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Figure 1A:
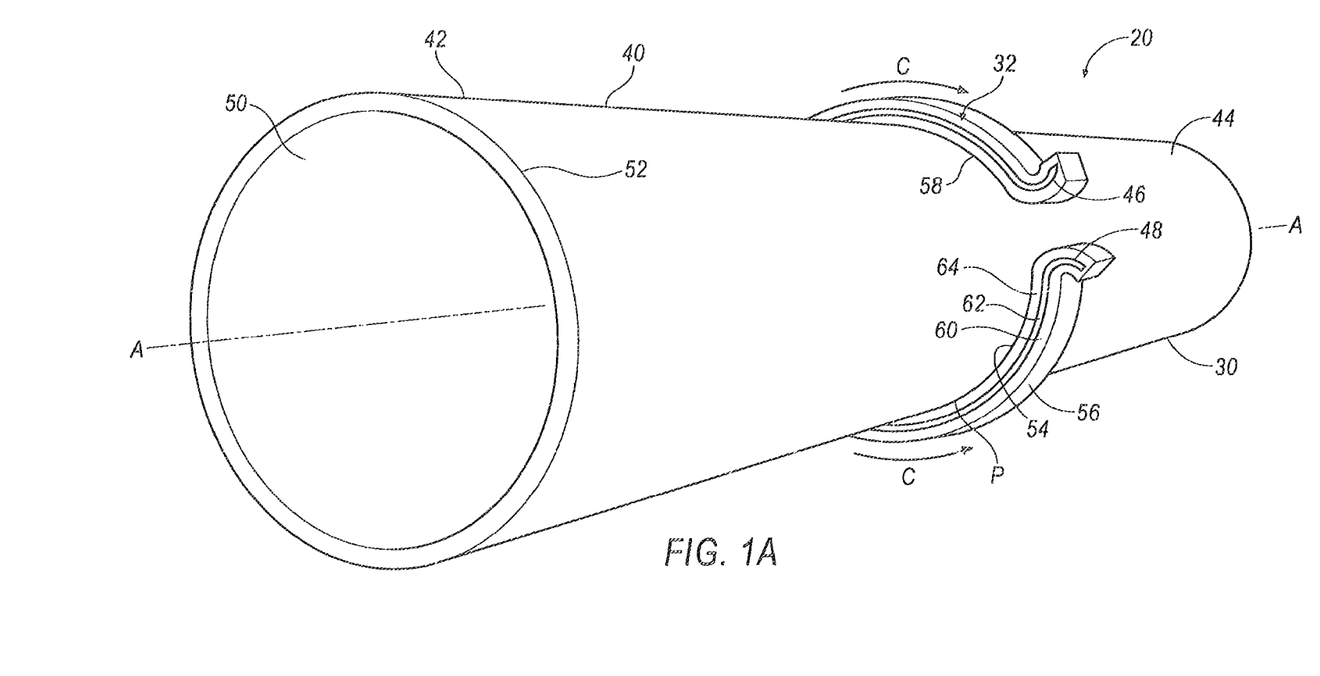
FIG. 1A is a perspective view of a shaft assembly including a shaft member and a damping member.

FIG. 1A illustrates a shaft assembly 20 including a shaft member 30 and at least one damping member 32. The shaft member 30 includes an outer surface 40, a first end portion 42, a second end portion 44, and a linear axis A-A defined by the first and second end portions 42 and 44. The shaft member 30 is illustrated as a generally hollow shaft including an interior surface 50, however, the shaft member 30 may be a solid shaft as well. In one example of the shaft assembly 20, the shaft member 30 is a propshaft of a motor vehicle. However, the shaft member 30 may be any mechanical component for transmitting torque and rotation.

Figure 1B:
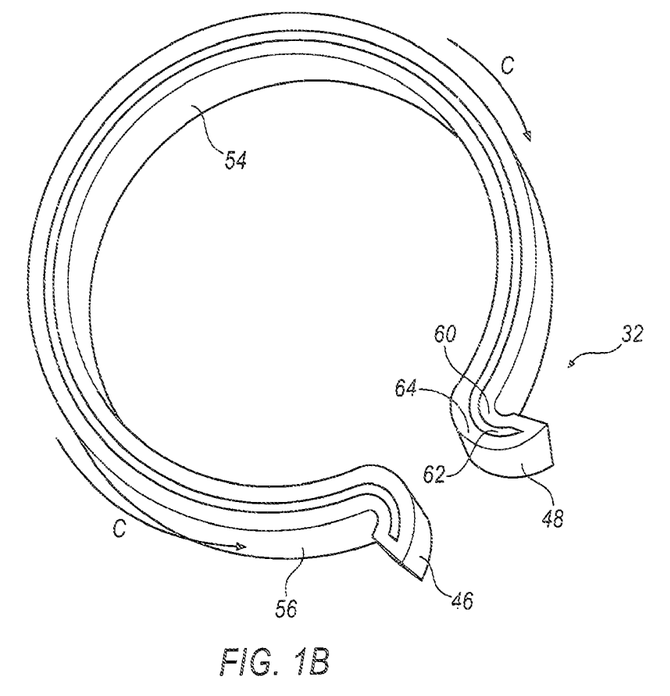
FIG. 1B is an enlarged view of the damping member.

The damping member 32 includes an inner surface 54 and an outer surface 56. FIG. 1B illustrates the damping member 32 as a substantially annular clip, where the body of the clip terminates at generally opposing ends 46 and 48. The body of the clip also defines a damper circumference 58 of the damping member 32. While the damping member 32 is illustrated as an annular clip, the damping member 32 may be any type of dampening member that can be placed in communication with the shaft member 30. For example, the damping member 32 may be a generally annular ring. Referring generally to FIGS. 1A-1B, the clip may be biased in a circumferential direction C, where the ends 46 and 48 may be generally biased towards one another, thereby causing the inner surface 54 of the clip to abut against the outer surface 40 of the shaft member 30, and at least a portion of the damping member 32 may be engaged with at least a portion of the outer surface 40 of the shaft member 30 at the damper circumference 58. Because the ends 46 and 48 are biased towards one another, the inner surface 54 of the clip tends to maintain a secure engagement with the outer surface 40 of the shaft member 30.

The inner surface 54 of the damping member 32 at least partially contacts the outer surface 40 of the shaft member 30 at a predetermined location P. Although FIG. 1A illustrates the damping member 32 positioned on the outer surface 40 of the shaft member 30, the damping member 32 may be located on any surface of the shaft member 30.

Providing a clip as the damping member 32 may be advantageous, as the clip can be assembled to the shaft member 30 by sliding the opposing ends 46 and 48 over an outer circumference 52 of the shaft member 30 during assembly of the damping member 32 to the shaft member 30, rather than over one of the ends 42 and 44 of the shaft member 30. Thus, the clip can be installed to the shaft member 30 either before or after the shaft member 30 has been assembled in a system. For example, if the shaft member 30 is a propshaft, the clip may be installed after the propshaft is assembled to other components, such as constant velocity joints, or to a motor vehicle. Moreover, a greater tolerance range between the clip and the shaft member 30 may be allowed as well when compared to a ring shaped damper, as the generally biased ends 46 and 48 of the clip maintain a secure engagement with the outer surface 40 of the shaft member 30.

The damping member 32 may be constructed from any type of damping material that is flexible such that the first and second ends 46 and 48 are able to fit over the outer circumference 52 of the shaft member 30. In one arrangement the damping material may be a polymer based material that exhibits heat resistant characteristics, such as, but not limited to, nitrile and Hydrogenated Nitrile Butadiene Rubber (HNBR). The damping material may also be able to withstand elevated temperatures as high as 150° C., as the shaft member 30 may be located on the underbody of a vehicle that is in proximity to an exhaust system having elevated temperatures.

In one exemplary arrangement, the damping member 32 may be configured as a constrained layer damping member. A constrained layer damping member is typically defined as a three layer damping material that includes a constraining layer 60, a damping layer 62 and a base layer 64. In one example the constraining layer 60 and the base layer 64 may be constructed from a metal based material, and the damping layer 62 may be constructed from a mastic material, however other materials may be used as well for each of the layers. Variables such as the durometer of the damping layer, the thickness of the damping layer, and the thickness of the constraining and the base layers may be adjusted depending on the characteristics of the breathing mode resonance of the shaft member 130. The base layer 64 includes the inner surface 54 of the damping member 32, while the constraining layer 60 includes the outer surface 56 of the damping member 32. The base layer 64 generally contacts the outer surface 40 of the shaft member 30.

Figures 2A, 2B:
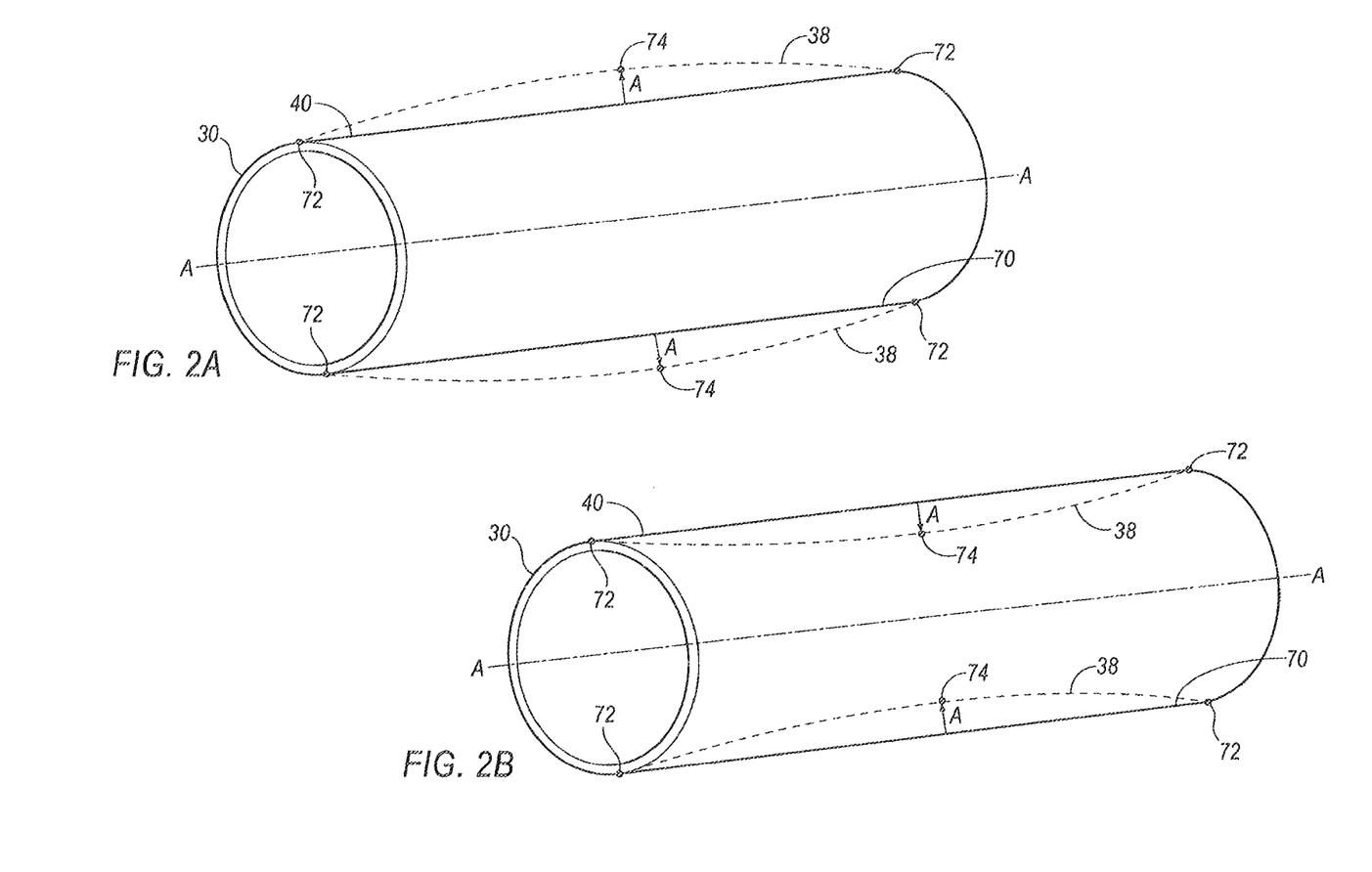
FIG. 2A is a perspective view of an undamped shaft member with a breathing mode resonance vibration at a first breathing mode, where the shaft member expands outwardly.
FIG. 2B is a perspective view of the undamped shaft member with a breathing mode resonance vibration at a first breathing mode, where the shaft member expands inwardly.

Turning to FIGS. 2A-2B, the breathing mode resonance of the shaft member 30 without the damping member 32 is illustrated, where the shaft member 30 experiences an undamped breathing mode resonance at a first breathing mode. Displacement of the outer surface 40 during the first breathing mode vibration is illustrated with dashed lines. FIG. 2A illustrates the outer surface 40 displaced radially outwardly away from the linear axis A-A, while FIG. 2B illustrates the outer surface 40 displaced radially inwardly towards the linear axis A-A. Referring generally to both FIGS. 2A-2B, the undamped breathing mode resonance creates an overall undamped absolute displacement 38 of the outer surface 40, as well as an undamped amplitude A. It should be noted that the overall undamped absolute displacement 38 of the shaft member 30 is exaggerated in an effort to illustrate the breathing mode resonance more effectively.

The overall undamped absolute displacement 38 represents the amount of displacement the outer surface 40 undergoes in relation to the linear axis A-A of the shaft member 30 during breathing mode vibration resonance. The overall absolute undamped displacement 38 may be positioned either radially inwardly or radially outwardly from the linear axis A-A of the shaft member 30. The undamped amplitude A may be the location where displacement of the outer surface 40 is at about a maximum during the first breathing mode, and may be measured from stationary position 70 of the outer surface 40.

Figure 2C:
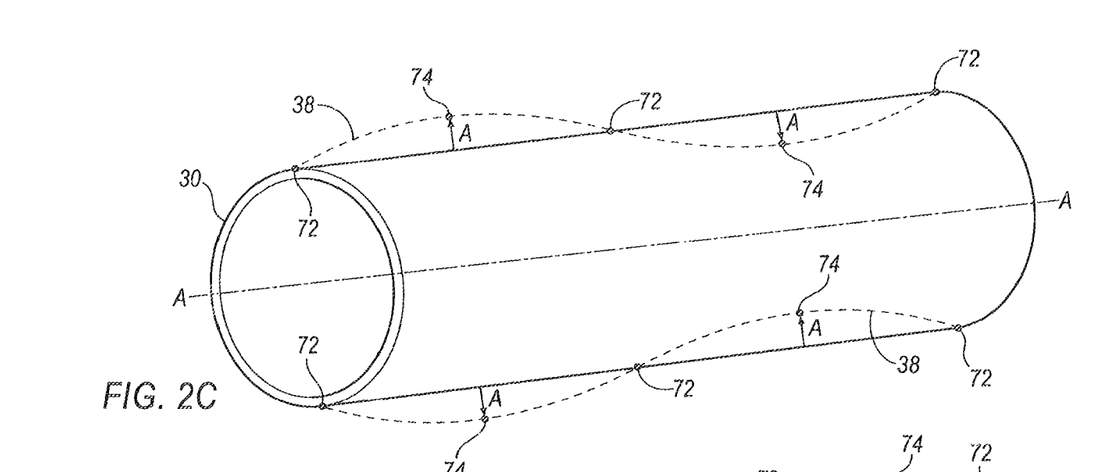
FIG. 2C is a perspective view of the undamped shaft member with the breathing mode resonance vibration at a second breathing mode.
Figure 2D:
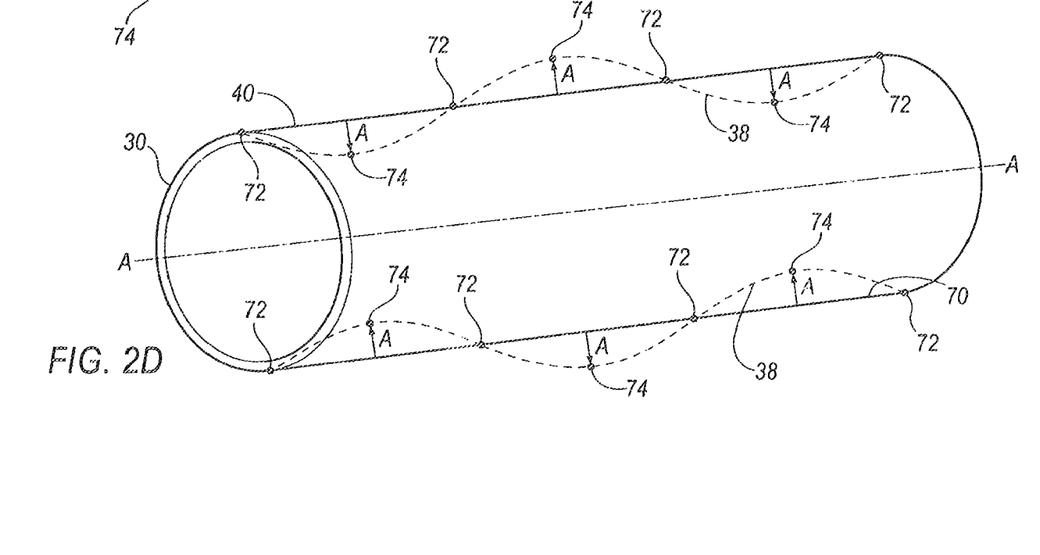
FIG. 2D is a perspective view of the undamped shaft member with the breathing mode resonance vibration at a third breathing mode.

Continuing to refer generally to FIGS. 2A-2B, the overall undamped absolute displacement 38 of the outer surface 40 may include two nodes 72 and one antinode 74. The nodes 72 are a series of locations where the overall undamped absolute displacement 38 of the outer surface 40 is at about a minimum, and the antinode 74 is a location where the overall undamped absolute displacement 38 of the outer surface 40 is about at a maximum. The maximum distance between the antinode 74 and the stationary position 70 of the outer surface 40 may be measured by the undamped amplitude A. The antinode 74 may be located at about a midpoint between the two nodes 72. Although FIG. 2A illustrates the shaft member 30 in a first breathing mode, the shaft member 30 can include any number of breathing modes as well, such as, for example, a second breathing mode or a third breathing mode, where FIG. 2C illustrates the shaft member 30 with a second breathing mode resonance and FIG. 2D illustrates the shaft member 30 with a third breathing mode resonance. Referring to FIG. 2C, the overall undamped absolute displacement of the second breathing mode may be defined by three nodes 72 and two antinodes 74. Turning to FIG. 2D, the overall undamped absolute displacement 38 of the third breathing mode may be defined by four nodes 72 and three antinodes 74.

Figure 3A:
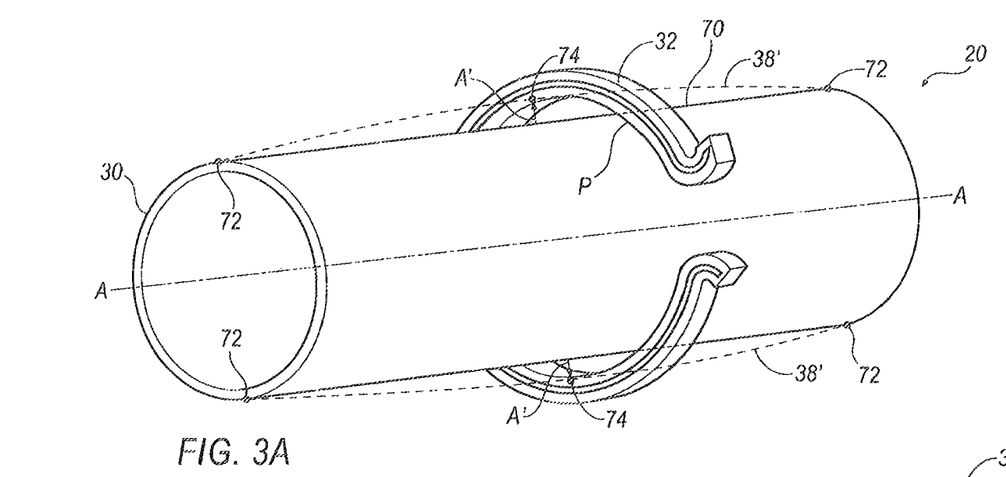
FIG. 3A is a perspective view of a damped shaft assembly including the damping member with the breathing mode resonance vibration at the first breathing mode where the shaft member expands outwardly.
Figure 3B:
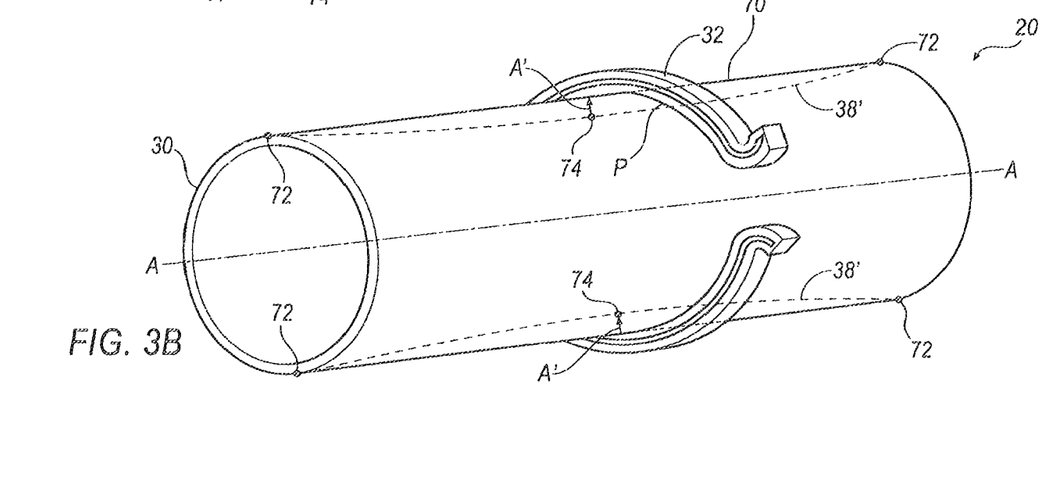
FIG. 3B is a perspective view of the damped shaft assembly including the damping member with the breathing mode resonance vibration at the first breathing mode, where the shaft member expands inwardly.

FIGS. 3A-3B are an illustration of the shaft assembly 20 with the damping member 32 assembled to the shaft member 30, where the shaft member 30 is in the first breathing mode resonance. FIG. 3A illustrates the outer surface 40 displaced radially outwardly away from the linear axis A-A, and FIG. 3B illustrates the outer surface 40 displaced radially inwardly towards the linear axis A-A. The damping member 32 and the shaft member 30 cooperate to define the damped breathing mode resonance that includes the overall damped absolute displacement 38' of the outer surface 40. The overall damped absolute displacement 38' includes a damped amplitude A' measured from the stationary position 70 of the outer surface 40. At least a portion of the overall undamped absolute displacement 38 of the outer surface 40 is greater than the overall damped absolute displacement 38'. That is, the damping member 32 generally reduces the magnitude of displacement of the outer surface 40 that occurs during operation of the shaft assembly 20. Thus, the damping member 32 generally dampens the amount of breathing mode resonance vibrations experienced by the shaft 30 during operation.

In one example of the shaft assembly 20, the predetermined location P of the damping member 32 may be at about the antinode 74. That is, referring generally to FIGS. 2A-2B, the predetermined location P may be at about the maximum distance between the overall undamped absolute displacement 38 and the stationary position 70 of the outer surface 40. Placing the damping member 32 at the antinode 74 may be particularly advantageous in at least some examples, as the damping member 32 tends to dampen the greatest amount of vibration at the antinode 74. This is because the damping member 32 usually dampens the most amount of vibration when placed in an area of maximum displacement.

Figures 3C, 3D:
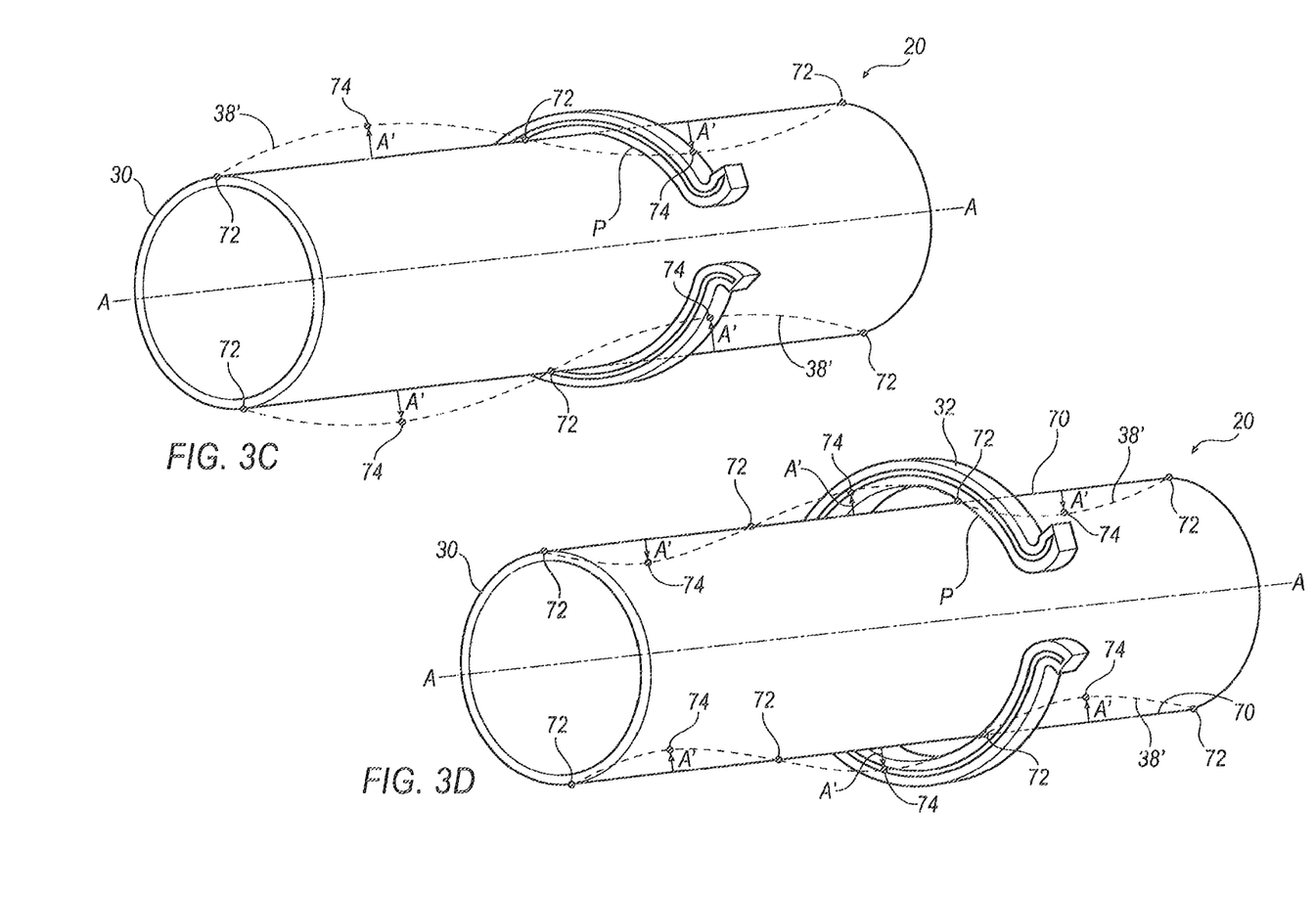
FIG. 3C is a perspective view of the damped shaft assembly with the breathing mode resonance vibration at the second breathing mode.
FIG. 3D is a perspective view of the damped shaft assembly with the breathing mode resonance vibration at the third breathing mode.

Although FIGS. 3A-3B illustrate the predetermined location P located at the antinode 74, the predetermined location P may be positioned at any location on the shaft member 30 that generally reduces the absolute displacement of the outer surface 40 during operation of the shaft member 20. For example, FIG. 3C is an illustration of the shaft assembly 20 at a second breathing mode resonance, and FIG. 3D is an illustration of the shaft assembly at a third breathing mode resonance. Referring to FIG. 3C, the overall damped absolute displacement 38' of the second breathing mode may be defined by three nodes 72 and two antinodes 74, where the predetermined location P may be between two of the nodes 72 and is generally not positioned at an antinode 74. Turning to FIG. 3D, the overall damped absolute displacement 38' of the third breathing mode may be defined by four nodes 72 and three antinodes 74, where the predetermined location P may also be between two of the nodes 72, and is generally not at an antinode 74. Although the predetermined location P is generally not at an antinode 74 in the second and third breathing modes, the damping member 32 is positioned such that the overall displacement of the outer surface 40 during the third breathing mode resonance is still reduced.

Reducing the vibrations occurring during breathing mode resonance of the shaft member 30 may be desirable to improve the noise quality of the shaft assembly 20 during operation. Specifically, reducing the breathing mode resonance vibrations typically reduces some types of particularly troublesome noises generated by the shaft member 30 during operation. In addition to generally reducing the breathing mode resonance vibrations in the shaft member 30, the damping member 32 may also have other advantages as well. For example, the damping member 32 may also be used in an effort to correct at least a portion of the rotational imbalance that is experienced in some types of shafts.

Figure 4:
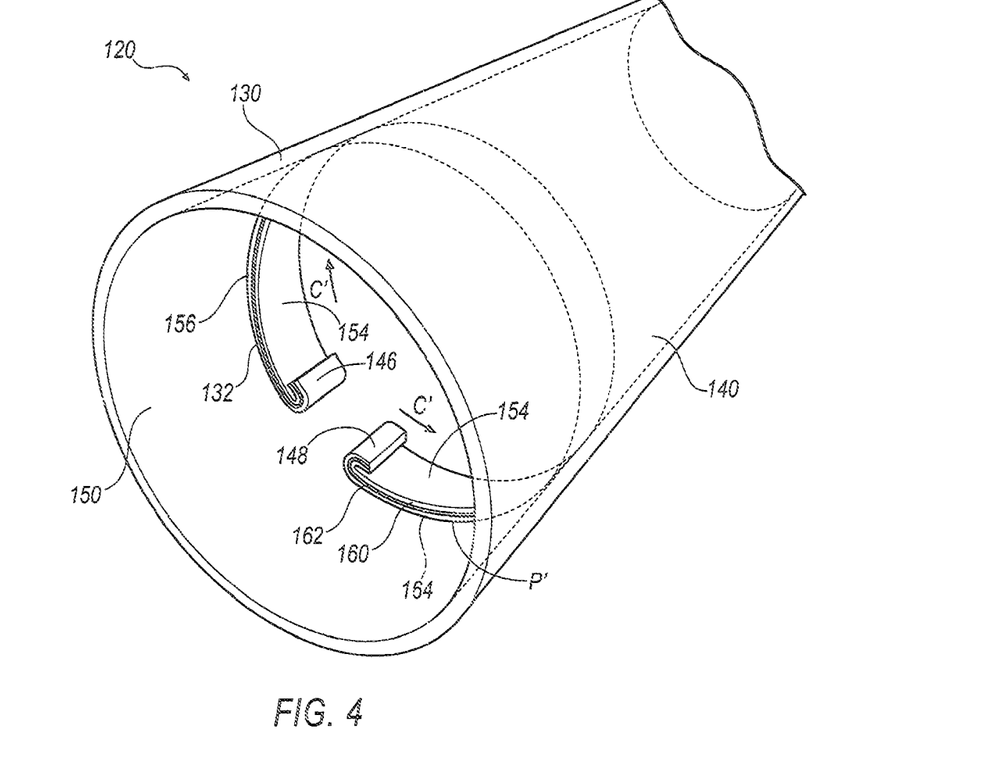
FIG. 4 is an alternative illustration of the shaft assembly and damping member.

Although the damping member 32 has been illustrated in FIGS. 1A-3C as being located on the outer surface 40 of the shaft member 30, FIG. 4 illustrates an alternative illustration of a shaft assembly 120 including a shaft member 130 with an outer surface 140 and a damping member 132 that is positioned within the shaft member 130 at a predetermined location P'. The damping member 132 includes an inner surface 154 as well as an outer surface 156, where the outer surface 156 generally contacts an interior surface 150 of the shaft member 130. FIG. 4 illustrates the damping member 132 as a substantially annular clip that includes generally opposing ends 146 and 148. The opposing ends 146 and 148 are generally biased away from one another in a circumferential direction C', causing the outer surface 156 of the clip to abut against the interior surface 150 of the shaft member 130.

The damping member 132 may also be constructed from a constrained layer damping member including a base layer 164, a damping layer 162 and a constraining layer 160. In one example the constraining layer 160 and the base layer 164 may be constructed from a metal based material, and the damping layer 162 may be constructed from a mastic material, however other materials may be used as well for each of the layers. Variables such as the durometer of the damping layer, the thickness of the damping layer, and the thickness of the constraining and the base layers may be adjusted depending on the characteristics of the breathing mode resonance of the shaft member 130. In this illustration, the base layer 164 includes the outer surface 156 of the damping member 132, while the constraining layer 160 includes the inner surface 154. The base layer 164 generally contracts the interior surface 150 of the shaft member 130.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

What is claimed is:

1. A shaft assembly, comprising:
    a shaft member having an outer surface; and
    a damping member constructed at least in part from a damping material and including a substantially annular body and generally opposing ends; and
    wherein the opposing ends are biased such that at least a portion of the damping member engages with the shaft member;
    wherein the damping member includes a damping layer disposed between a constraining layer and a base layer;
    wherein at least one of the constraining layer and base layer are a metal based material; and
    wherein the shaft member includes at least one antinode created during breathing mode vibration resonance of the shaft member, and the damping member engages the shaft member at a predetermined location that is the antinode of the shaft member.

2. The shaft assembly of claim 1, wherein the opposing ends are biased, towards one another and the base layer of the damping member engages the outer surface of the shaft member.

3. The shaft assembly of claim 1, wherein the constraining layer and base layer are a metal based material.

4. The shaft assembly of claim 1, wherein the damping layer is a mastic material.

5. The shaft assembly of claim 1, wherein the damping member is flexible and configured to allow the opposing ends to be displaced in a circumferential direction to engage the outer surface of the shaft member.

6. The shaft assembly of claim 1, wherein the shaft member includes at least two antinodes created during a breathing mode vibration resonance of the shaft member, and the damping member engages the shaft at a predetermined location that is generally between two of the antinodes of the shaft member.

7. The shaft assembly of claim 1, wherein the shaft member is hollow, creating an interior surface of the shaft member, and the opposing ends of the damping member are biased away from one another such that the base layer of the damping member engages the interior surface of the shaft member.

8. The shaft assembly of claim 1, wherein each of the opposing ends of the damping member are folded back away from the other.

9. A damping member for a shaft member, comprising:
    a substantially annular body constructed at least in part from a damping material;
    generally opposing ends of the annular body, wherein the opposing ends are biased in a predetermined direction;
    wherein the damping member includes a damping layer disposed between a constraining layer and a base layer;
    wherein at least one of the constraining layer and base layer are a metal based material; and
    wherein the base layer of the damping member is configured to engage the shaft member at a predetermined location, the shaft member including at least one antinode created during vibration resonance and the predetermined location is positioned at the antinode.

10. The damping member of claim 9, wherein the opposing ends are biased towards one another in a circumferential direction.

11. The damping member of claim 9, wherein the opposing ends are biased away from another in a circumferential direction.

12. The damping member of claim 9, wherein the base layer and the constraining layer are a metal based material.

13. The damping member of claim 9, wherein the damping layer is a mastic material.

14. The damping member of claim 9, wherein the damping layer is constructed from a polymer based material.

15. The shaft assembly of claim 9, wherein each of the opposing ends of the damping member are folded back away from the other.

16. The shaft assembly of claim 9, wherein the base layer of the damping member is configured to engage the shaft member at a predetermined location, the shaft member including at least two antinodes created during vibration resonance and the predetermined location is positioned between two of the antinodes.

\* \* \* \* \*